United States Patent [19]
McIntosh

[11] 4,305,488
[45] Dec. 15, 1981

[54] ACCESSORY DRIVE SYSTEM

[75] Inventor: Arthur M. McIntosh, Arlington Heights, Ill.

[73] Assignee: Borg-Warner Corporation, Chicago, Ill.

[21] Appl. No.: 93,577

[22] Filed: Nov. 13, 1979

[51] Int. Cl.³ .................. B60K 41/26; F16H 57/10
[52] U.S. Cl. .................. 192/4 A; 74/336 B; 74/689; 74/781 R; 474/18; 180/165
[58] Field of Search .............. 192/4 A, 4 R; 74/801, 74/751, 752, 336 B, 15.2, 15.4, 665 G, 689, 665 B, 675, 781 R; 474/18, 25, 28; 180/165

[56] References Cited

U.S. PATENT DOCUMENTS

| | | | |
|---|---|---|---|
| 2,699,293 | 1/1955 | Svendsen | 192/48.3 |
| 2,959,070 | 11/1960 | Flinn | 74/665 G |
| 3,405,571 | 10/1968 | Mersch | 74/675 |
| 3,557,640 | 1/1971 | Hendriks et al. | 192/4 A |
| 3,918,312 | 11/1975 | Espenschied et al. | 474/18 |

Primary Examiner—George H. Krizmanich
Attorney, Agent, or Firm—Julian Schachner

[57] ABSTRACT

A vehicle accessory drive assembly incorporates a speed-increasing planetary gear set with an engine-driven carrier input. A flywheel output is engaged with the ring gear through an overrunning clutch. A shiftable power train couples the output side of the vehicle transmission with the sun gear so that normally the output speed range is compressed relative to the input speed range. Accessory speeds are increased when the vehicle is stationary and the engine is running at idle. Changing accessory torque demands are satisfied smoothly. Upon application of the vehicle braking system, the power train is shifted so that the flywheel overruns the ring gear. Some of the energy which would be lost in the braking effort or during engine deceleration is absorbed by the flywheel, and is used to help drive the accessories.

16 Claims, 1 Drawing Figure

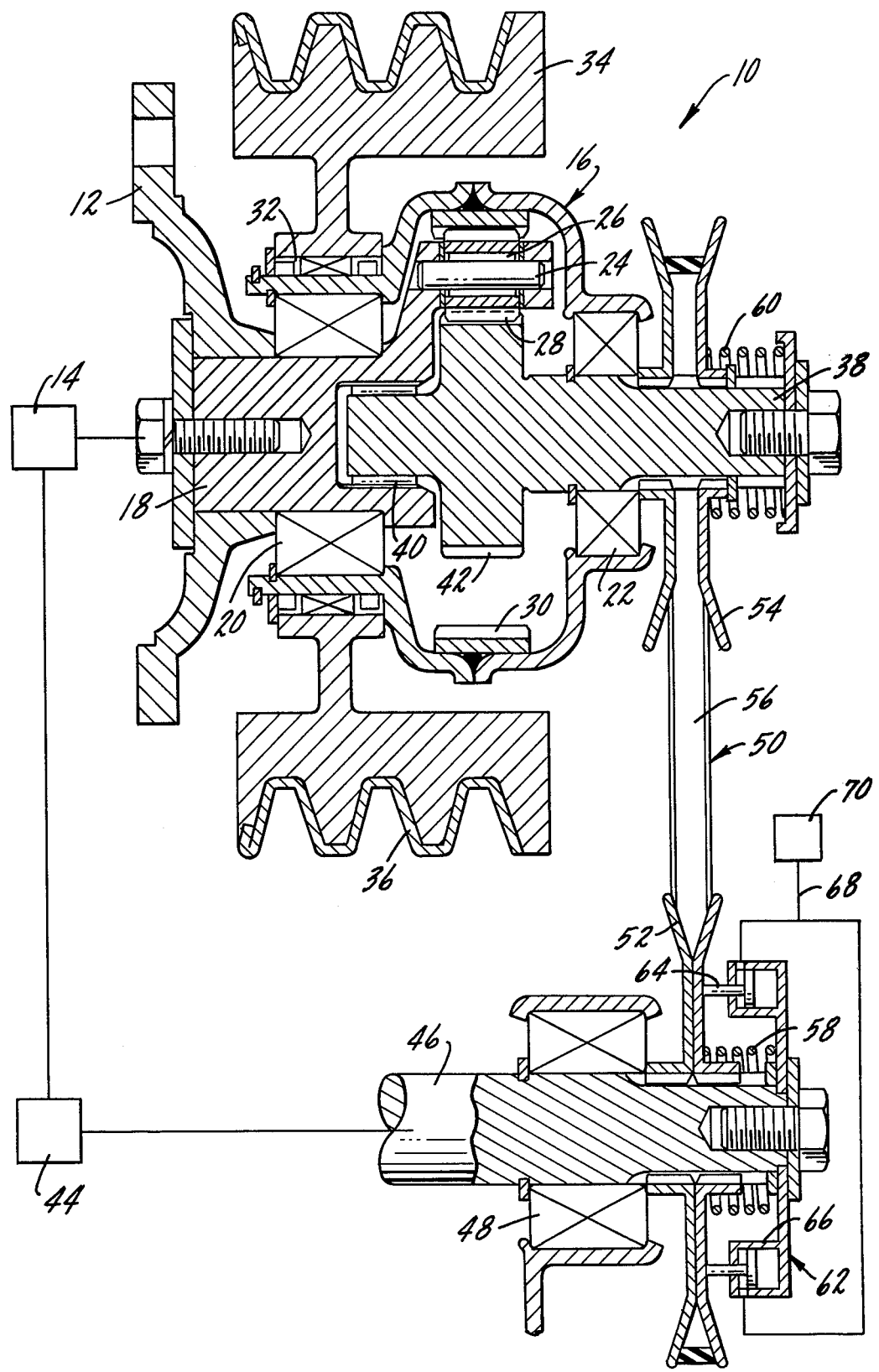

ACCESSORY DRIVE SYSTEM

BACKGROUND OF THE INVENTION

This invention relates generally to drive systems. More particularly, it relates to an assembly which is adapted to drive the accessories in a vehicle. In such an adaptation, the assembly absorbs some of the energy which normally would be lost when the vehicle brakes are applied or the engine decelerates, and uses this energy to help drive the accessories.

Modern vehicle engines are called upon to drive an increasing number of accessories. As much as twenty-five percent of the engine brake horsepower available may be required to drive them. Thus, the efficiency of the accessory drive system is important in so far as it relates to fuel economy.

The ideal condition would be to drive the accessories at a constant speed. This is impractical in an automotive vehicle. Generally, an accessory drive system drives accessories at some speed which is a linear function of engine speed. At low engine speeds, for example at engine idle speed, it may be necessary to increase the size and capacity of the accessories. Similarly, at high engine speeds, the accessories may be driven too fast for efficient operation.

Copending U.S. application Ser. No. 90,191 filed Nov. 1, 1979 discloses an accessory drive assembly incorporating a planetary gear set and a power train. The carrier is driven by the engine crankshaft of an associated vehicle. The ring gear provides the driving torque for vehicle accessories. The sun gear is driven by the tailshaft of the vehicle through the power train.

With the engine running at idle and the vehicle stopped, the planetary gear set develops an output speed which is some multiple of engine speed. When the vehicle begins moving, the sun gear is driven at some multiple of tailshaft speed. Thus, assembly output speed increases at a rate slower than that of engine speed. The result is a compression of the assembly output speed range as compared with the engine speed range, and an improvement in the operating efficiency of the accessory drive assembly.

However, considerable energy is lost during the period in which the vehicle brakes are applied. Indeed, energy distribution in a passenger car during a city/highway EPA cycle is such that as much as fourteen percent of the vehicle's brake horsepower may be dissipated in braking. If some of this energy could be applied to help drive the vehicle accessories, overall operating efficiency would be improved even more, with a resulting improvement in fuel economy.

The accessory drive assembly disclosed in the aforementioned U.S. application Ser. No. 90,191 inherently is unable to utilize energy lost in braking. Thus, there remains a need in the art for a simple, inexpensive accessory drive system with an output speed range that is compressed as compared with its input speed range, and with the capability of absorbing and using some of the energy which otherwise would be lost when the vehicle brakes are applied or the engine is decelerated.

SUMMARY OF THE INVENTION

This invention is directed to such a system. To that end, an accessory drive assembly incorporates a planetary gear set, a flywheel and a power train. The carrier is driven by the engine crankshaft of an associated vehicle. The flywheel is coupled with the ring gear by an overrunning clutch/bearing and provides driving torque for the vehicle accessories. The sun gear is driven by the tailshaft of the vehicle through the power train.

The power train normally is in an overdrive mode. Means are provided for shifting the power train to an underdrive mode in response to some external signal, such as actuation of the braking system in an associated vehicle.

With the engine running at idle and the vehicle stopped, the flywheel is locked to the ring gear, and the planetary gear set develops an accessory drive speed greater than engine speed. When the vehicle begins moving, the sun gear is driven faster than the tailshaft, thus increasing assembly output speed at a rate slower than that of engine speed. The result is a compression of the assembly output speed range as compared with the engine speed range.

When the braking system is applied, the power train shifts to its underdrive mode. The sun gear now is driven slower than the tailshaft. This tends to cause an increase in assembly output speed. However, at the same time decreasing engine speed causes the planetary gear set to slow down. At some point the flywheel overruns the ring gear, and its own inertia provides drive for the vehicle accessories.

BRIEF DESCRIPTION OF THE DRAWING

The objects and advantages of this invention will become apparent to those skilled in the art upon careful consideration of the specification herein, including the drawing, wherein a sectional view of the accessory drive assembly is shown.

While this invention is susceptible of embodiment in many different forms, a preferred embodiment shown in the drawing will be described in detail. It should be understood that the present disclosure is considered to be an exemplification of the principles of the invention, and is not intended to limit the invention to this embodiment.

DESCRIPTION OF A PREFERRED EMBODIMENT

Referring to the drawing in further detail, there is shown an accessory drive assembly 10. Assembly 10 includes a driving flange 12 adapted for connection directly or indirectly to the crankshaft of an engine 14 in an associated automotive vehicle.

A planetary gear set 16 includes a first rotatable member 18 in the form of a carrier or the like. Carrier 18 is connected to flange 12 so as to be driven by engine 14.

Carrier 18 supports a plurality of pins 24, one of which is shown in the drawing. Each pin 24 in turn supports a suitable bearing 26. A planet pinion gear 28 is journalled on each bearing 26.

A ring gear 30 is journalled on suitable bearings 20 and 22 in meshing relationship with planet gears 28. Ring gear 30 supports a suitable one-way, overrunning clutch/bearing 32. This one-way clutch 32 is conventional, and need not be described in detail. A flywheel 34 is supported on one-way clutch 32 such that it may overrun ring gear 30. Flywheel 34 defines a suitable output pulley 36 or the like. Pulley 36 supplies the drive for the associated accessories.

A second rotatable member 38 in the form of a shaft or the like is journalled in bearing 22 and in a suitable bearing 40 supported by carrier 18. Shaft 38 defines a sun gear 42 in meshing relationship with planet gears 28.

Engine 14 drives an associated vehicle transmission 44. This transmission 44, which may be either manual or automatic, in turn drives a third rotatable member 46 which is journalled in a suitable bearing 48. In a preferred form of the invention, member 46 is the tailshaft of an associated vehicle. However, it should be understood that member 46 may be any portion of the vehicle driveline on the output side of transmission 44.

An assembly power train 50 includes a first pulley 52, a second pulley 54 and a suitable belt 56 coupling pulleys 52,54. Pulley 52 is secured to tailshaft 46 for rotation therewith and sliding movement relative thereto. Pulley 52 is slidable between a first position having a relatively large effective pitch diameter and a second position having a relatively small effective pitch diameter. Similarly, pulley 54 is secured to shaft 38 for rotation therewith and sliding movement relative thereto. Pulley 54 is slidable between a first position having a relatively small effective pitch diameter and a second position having a relatively large effective pitch diameter. Suitable resilient elements 58 and 60 in the form of springs or the like cooperatively bias pulleys 52,54 toward their first position as shown in the drawing. In this position, power train 50 is in an overdrive or speed-increasing mode.

A power-operated device 62 is provided for shifting pulleys 52,54 to their second position in response to an external signal. Device 62 may take any suitable form. In a preferred form of the invention, device 62 is a piston and cylinder combination wherein one or more pistons 64 are secured to a sheave of pulley 52. Each piston 64 is slidable in a cylinder 66. A fluid line 68 communicates each cylinder 66 with the braking system 70 of an associated vehicle. When the vehicle brakes are applied, an external signal in the form of a build-up of fluid pressure in cylinder 66 moves piston 64 such that pulleys 52,54 are moved to their second position. In this position, power train 50 is in its underdrive or speed-decreasing mode.

When fluid pressure in cylinder 66 is relieved, the biasing force of spring 58, which is greater than that of spring 60, moves pulleys 52,54 back to their first position. In this position, power train 50 again is in its overdrive or speed-increasing mode.

As disclosed herein, device 62 is associated with tailshaft 46 and pulley 52. Obviously, device 62 may be associated with shaft 38 and pulley 54 if desired.

With power train 50 in its speed-increasing mode and flywheel 34 locked to ring gear 30, operation of assembly 10 is as disclosed in the aforementioned U.S. application Ser. No. 90,191. The relationship of flywheel output speed to carrier input speed is affected by the speed of sun gear 42. When the associated vehicle is stationary or is operating in forward, the speed relationships within the accessory drive assembly are such that the output speed range is compressed relative to the input speed range. At low engine speeds, output speeds will be desirably higher. At high engine speeds, output speeds will be desirably lower. Associated vehicle accessories are operated within a narrower speed range than would otherwise be the case. Further, changing torque demands of the accessories are satisfied smoothly, and the accessories are allowed to freewheel during engine deceleration, saving energy.

When the vehicle is moving in reverse, a different condition is encountered. Due to the fact that reverse sun gear speeds are considered to be mathematically negative, output speeds will vary more than the corresponding input speeds. However, this is tolerable because operation in reverse generally is for short periods of time.

When the vehicle brakes are applied, power train 50 shifts from its speed-increasing mode to its speed-decreasing mode. At the same time, engine 14 slows down. The relationship is such that sun gear 42 slows down faster than carrier 18. As a result, the speed of ring gear 30 increases for a short period of time. During this period, the speed of flywheel 34 increases, thereby increasing its inertia.

At some point, flywheel 34 will overrun ring gear 30. Under this condition, the inertia of flywheel 34 provides the energy for driving the associated vehicle accessories, even if the vehicle comes to a complete stop with engine 14 running at idle and tailshaft 46 stationary. When the application of braking system 70 is discontinued, power train 50 will be shifted back to its speed-increasing mode, but flywheel 34 may continue to overrun ring gear 30.

As the vehicle begins moving again, the speed of ring gear 30 again will increase. Clutch 32 will engage when the speed of ring gear 30 reaches that of flywheel 34. This returns assembly 10 to its original configuration.

Thus, it will be seen that an accessory drive assembly as disclosed herein provides a compressed output speed range for operation of the accessories as compared with the input speed range. It increases accessory speed at idle, and smoothly meets changing torque demands. When the brakes of an associated vehicle are applied, the assembly absorbs a portion of the braking energy which otherwise would be lost. This energy is stored in the form of inertia in a flywheel, and is used for driving the accessories. As a result, overall efficiency of the accessory drive assembly is improved.

The mass of flywheel 34 could be eliminated and output pulley 36 coupled directly to ring gear 30 through one-way clutch 32. Output pulley 36 would overrun ring gear 30 when the vehicle brakes are applied or during engine deceleration, and the inertia inherent in the mass of the associated vehicle accessories would provide some of the energy for continued accessory operation. Alternatively, accessory mass could be increased to compensate for the absence of flywheel mass.

The assembly as disclosed herein inherently has an additional advantage. With assembly 10 as shown in the drawing, flywheel 34 will overrun ring gear 30 during the upshifting of an associated vehicle transmission. Wide variations in accessory drive speeds are eliminated, and assembly efficiency again is improved. Further, the same improvement will be obtained during engine deceleration when the vehicle operator lifts his foot off of the throttle but does not apply the brakes.

The various ratios for gear set 16, transmission 44 and power train 50 obviously may be selected in conformity with design requirements.

It should be obvious that planetary gear set 16 may be in the form of a bevel gear differential if desired. Similarly, power train 50 is disclosed as a belt/pulley arrangement. Obviously, some other suitable power train may be incorporated in the design if desired.

It is apparent that although the invention as disclosed herein provides a novel arrangement for driving the accessories of an associated automotive vehicle, it is readily adaptable for use in other environments where similar operating characteristics may be desired.

It should be understood that while a preferred embodiment of the invention has been shown and described, this is to be considered as illustrative and may be modified by those skilled in the art. It is intended that the claims herein cover all such modifications as may fall within the spirit and scope of the invention.

What is claimed is:

1. A drive assembly comprising first and second rotatable members, said first member defining a carrier, said second member defining a sun gear, a ring gear, planet gear means supported by said carrier in meshing relationship with said sun and ring gears, flywheel means in overrunning driven engagement with said ring gear, and a power train in driving engagement with said second member and adapted for driven engagement with a third rotatable member, said power train being shiftable to speed-increasing and speed-decreasing modes, means biasing said power train toward said speed-increasing mode, and means responsive to an external signal for shifting said power train to said speed-decreasing mode.

2. The invention of claim 1, one-way clutch means coupling said flywheel means with said ring gear for effecting said overrunning driven engagement therebetween, whereby said flywheel means may overrun said ring gear.

3. The invention of claim 1, said assembly being constructed and arranged such that when said power train is in said speed-increasing mode said sun gear will accelerate faster than said carrier so as to have a speed-decreasing effect on said ring gear.

4. The invention of claim 2, said assembly being constructed and arranged such that when said power train is in said speed-increasing mode said sun gear will accelerate faster than said carrier so as to have a speed-decreasing effect on said ring gear.

5. The invention of claim 1, 2, 3 or 4, said assembly being constructed and arranged such that when said power train is in said speed-decreasing mode said sun gear will decelerate faster than carrier so as to increase the stored energy level of said flywheel means.

6. In a drive system adapted for use in a vehicle having an engine, a tailshaft, a brake system, and associated accessories, an accessory drive assembly comprising a speed-increasing planetary gear set adapted to be driven by said engine, a flywheel in overrunning driven relationship with said planetary gear set and adapted to drive said accessories, and a power train adapted to couple said tailshaft with said planetary gear set, said power train being shiftable to speed-increasing and speed-decreasing modes, means biasing said power train toward said speed-increasing mode, and means adapted to be responsive to the application of said brake system for shifting said power train to said speed-decreasing mode, whereby rotation of said tailshaft causes a reduction in the speed-increasing effect of said planetary gear set when said power train is in said speed-increasing mode and causes an increase therein when said power train is in said speed-decreasing mode.

7. The invention of claim 6, said planetary gear set including an input carrier adapted for driven engagement with said engine, a sun gear in driven engagement with said power train, a ring gear, and planet gear means supported by said carrier in meshing relationship with said sun and ring gears, said flywheel being adapted for driving engagement with said accessories, and a one-way clutch coupling said flywheel with said ring gear such that said flywheel may overrun said ring gear.

8. The invention of claim 7, said power train including a first pulley adapted to be secured to said tailshaft for rotation therewith and movement relative thereto, a second pulley secured to said sun gear for rotation therewith and movement relative thereto, and a belt coupling said first and second pulleys, said biasing means biasing said pulleys toward a first position thereby establishing said speed-increasing mode, and said shifting means being adapted to be responsive to the application of said brake system for effecting movement of said pulleys to a second position thereby establishing said speed-decreasing mode.

9. The invention of claim 7, said assembly being constructed and arranged such that when said power train is in said speed-increasing mode said sun gear will accelerate faster than said carrier so as to have a speed-decreasing effect on said ring gear.

10. The invention of claim 8, said assembly being constructed and arranged such that when said power train is in said speed-increasing mode said sun gear will accelerate faster than said carrier so as to have a speed-decreasing effect on said ring gear.

11. The invention of claim 7, 8, 9 or 10, said assembly being constructed and arranged such that when said power train is in said speed-decreasing mode said sun gear will decelerate faster than said carrier, whereby said flywheel will be driven faster by said ring gear.

12. A drive assembly comprising first and second rotatable members, said first member defining a carrier, said second member defining a sun gear, a ring gear, planet gear means supported by said carrier in meshing relationship with said sun and ring gears, output means in overrunning driven engagement with said ring gear, and a power train in driving engagement with said second member and adapted for driven engagement with a third rotatable member, said power train being shiftable to speed-increasing and speed-decreasing modes, means biasing said power train toward said speed-increasing mode, and means responsive to an external signal for shifting said power train to said speed-decreasing mode.

13. The invention of claim 12, said output means including a flywheel, and a one-way clutch coupling said flywheel with said ring gear for effecting said overrunning driven engagement therebetween, whereby said flywheel may overrun said ring gear.

14. In a drive system adapted for use in a vehicle having an engine, a tailshaft and associated accessories, an accessory drive assembly comprising a speed-increasing planetary gear set adapted to be driven by said engine, output means in overrunning driven relationship with said planetary gear set and adapted to drive said accessories, and a power train adapted to couple said tailshaft with said planetary gear set, said power train being shiftable to speed-increasing and speed-decreasing modes, means biasing said power train toward said speed-increasing mode, and means responsive to an external signal for shifting said power train to said speed-decreasing mode.

15. The invention of claim 14, said planetary gear set including an input carrier adapted for driven engagement with said engine, a sun gear in driven engagement with said power train, a ring gear, and planet gear means supported by said carrier in meshing relationship with said sun and ring gears, and said output means including a flywheel adapted for driving engagement with said accessories, and a one-way clutch coupling said flywheel with said ring gear such that said flywheel may overrun said ring gear.

16. The invention of claim 14 or 15, said power train including a first pulley adapted to be secured to said tailshaft for rotation therewith, a second pulley secured to said sun gear for rotation therewith, and a belt coupling said first and second pulleys.

* * * * *